(12) United States Patent
Lamb

(10) Patent No.: US 6,791,571 B1
(45) Date of Patent: Sep. 14, 2004

(54) ABSOLUTE AND RELATIVE COORDINATE BASED FORMAT DESCRIPTION SYSTEM AND METHOD

(75) Inventor: Steven Dale Lamb, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/259,751

(22) Filed: Feb. 27, 1999

(51) Int. Cl.[7] .............................. G09G 5/00; G06F 17/00
(52) U.S. Cl. ...................... 345/619; 715/513; 715/517; 345/835
(58) Field of Search ................................. 345/433, 439, 345/619, 621; 707/517, 510; 715/513, 517

(56) References Cited

U.S. PATENT DOCUMENTS

| | | | | |
|---|---|---|---|---|
| 5,548,692 A | * | 8/1996 | Cok ............................ | 345/433 |
| 5,557,726 A | * | 9/1996 | Yoshizawa ................... | 345/330 |
| 5,781,189 A | * | 7/1998 | Holleran et al. ............. | 345/335 |
| 5,825,368 A | * | 10/1998 | Wilks .......................... | 345/440 |
| 5,923,329 A | * | 7/1999 | Beale .......................... | 345/418 |
| 5,966,135 A | * | 10/1999 | Roy et al. .................... | 345/433 |
| 5,990,901 A | * | 11/1999 | Lawton et al. ............... | 345/429 |
| 6,028,608 A | * | 2/2000 | Jenkins ........................ | 345/433 |
| 6,088,708 A | * | 7/2000 | Burch et al. ................. | 715/509 |
| 6,161,114 A | * | 12/2000 | King et al. .................. | 707/517 |
| 6,161,126 A | * | 12/2000 | Wies et al. .................. | 709/203 |
| 6,204,850 B1 | * | 3/2001 | Green .......................... | 345/850 |
| 6,356,283 B1 | * | 3/2002 | Guedalia ...................... | 345/760 |
| 6,426,745 B1 | * | 7/2002 | Isaacs et al. ................. | 345/419 |

\* cited by examiner

Primary Examiner—Matthew C. Bella
Assistant Examiner—A Blackman
(74) Attorney, Agent, or Firm—Lyon & Harr, L.L.P.; Craig S. Fischer

(57) ABSTRACT

The present invention is embodied in an absolute and relative coordinate based format description system and method for displaying information, such as text, graphics, audio/visual multimedia, hyperlinks, etc. within a computer environment. Multimedia information including text, graphics, audio media, visual media and hyperlinks, is effectively presented and displayed within the computer environment. The multimedia information is contained within geometrical objects, which can be located anywhere within a working area with absolute or relative positioning and properties. Each object can be independent of other objects (absolute values) or dependent on other objects (relative values).

29 Claims, 5 Drawing Sheets

ABSOLUTE AND RELATIVE COORDINATE BASED FORMAT DESCRIPTION SYSTEM AND METHOD

BACKGROUND OF THE INVENTION

1. Field of the Invention

The present invention relates to a system and method for formatting and displaying data, and in particular, to an absolute and relative coordinate based format description system and method for displaying information, such as text, graphics, audio/visual multimedia, etc. within a computer environment.

2. Related Art

Effective presentation of information in interactive computer environments, such as hypertext markup language (HTML) environments, is important. Most World Wide Web (WWW) sites on the Internet are presented in HTML environments and rely on effective presentation of their respective information to attract interactive users to their respective WWW sites. For HTML environments, interactive information is usually presented with multimedia content, including a combination of text, graphics, audio media, visual media and hyperlinks.

Many HTML WWW sites utilize specific formatting techniques, such as table formatting techniques, for presenting their information. Table formatting techniques allow information to be displayed in an organized flat, two-dimensional box or table. Each table is comprised of a plurality of orthogonal rows and columns of cells. Also, each table can be located within another parent table, which can be located within a grandparent table, and so on to thereby form nested tables. Certain predefined cells of the tables typically can contain text, graphics, audio media, video media, etc. Table formatting techniques allow organized and rigidly structured presentation of information in HTML environments.

However, since formatted tables are comprised of orthogonal rows and columns of cells, formatted tables are always limited to rectangular shapes. Also, random, offset or complex placement of multimedia, such as random placement of images or discrete placement of adjacent images or adjacent lines of text, require separate or complicated nested tables. In addition, complex presentation of multimedia requires tedious and time-consuming conceptual planning, preparation and layout of the nested tables before the table formatting is actually created. Further, although some HTML editors and generators can automatically process non-HTML formatted multimedia content and generate HTML formatted tables of the multimedia content, the formatted tables that are usually created are unduly complex, usually cannot be sufficiently modified in real time and are often impossible to manually edit after the formatted tables are automatically created.

Therefore, what is needed is an effective and efficient technique for presenting information, such as interactive multimedia, in an easy and flexible format for HTML environments. What is also needed is a system and method for automatically generating and positioning coordinate generated text, graphics and audio/visual multimedia with absolute and relative locations within an HTML environment without requiring complex table formatting.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in an absolute and relative coordinate based format description system and method for displaying information, such as text, graphics, audio/visual multimedia, etc. within a computer environment.

Specifically, the present invention allows multimedia information including text, graphics, audio media, visual media and hyperlinks, to be effectively presented and displayed within a computer environment. The multimedia information is contained within geometrical objects, which can be located anywhere within any type of user interface layout of a computer environment, such as an HTML working area, publishing software canvas, visual programming applications, and the like, with absolute or relative positioning and properties. Each object can be independent of other objects (absolute values) or dependent on other objects (relative values).

In addition, the geometrical objects can be nested within each other, overlaid on top of one another, located randomly within the user interface layout or subsequently modified, repositioned or resized based on absolute or relative values. A feature of the present invention is that the geometrical objects are true objects and can exist and be modified within the user interface layout based on either absolute or relative formatting. An advantage of this is that the geometrical objects can be created without the rigid structure formatting that is required by formatted tables and the present invention is not subject to the strict orthogonality requirements of formatted tables.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

Figure 1:
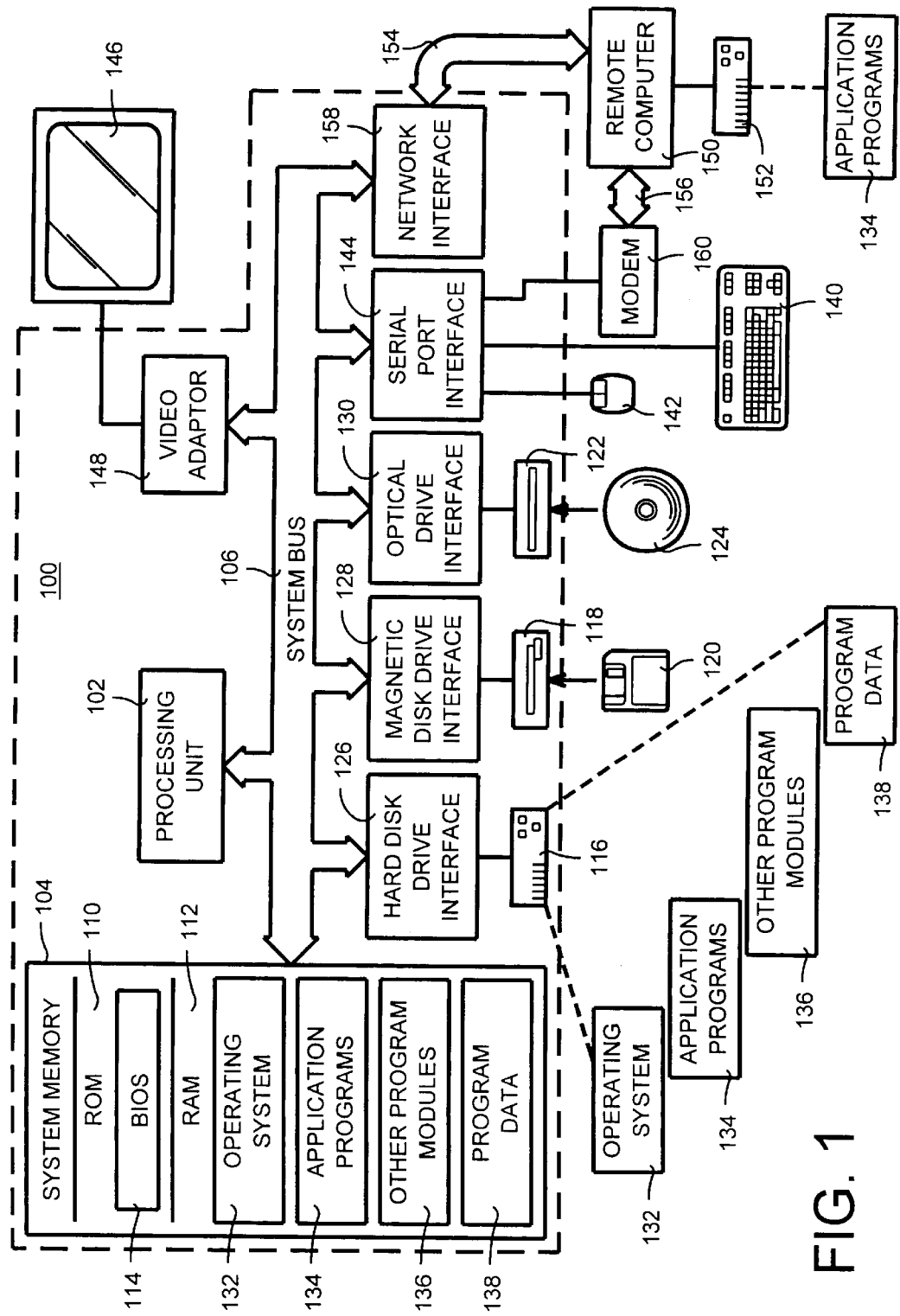
FIG. 1 is a block diagram illustrating an apparatus for carrying out the invention.

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

Effective presentation and display of multimedia content within computer environments is very desirable, especially for interactive user interface layouts, such as HTML computer environments operating on the World Wide Web (WWW), publishing software canvases, visual programming applications, and the like. In addition, with regard to HTML environments, automatic conversion of non-HTML formatted multimedia into HTML formatted multimedia is very desirable. The present invention provides effective presentation of information and automatic HTML format generation with an absolute and relative coordinate based format description system and method. The system and method of the present invention provides information formatting for generating and displaying multimedia, such as text, graphics, audio/visual multimedia, hyperlinks, etc., within any user interface layout of computer environments.

Namely, the coordinate based format description of the present invention utilizes geometrical objects that can be created and located within any user interface layout, such as a working HTML area, with absolute and/or relative positions and properties. The geometrical objects can be absolutely positioned within a particular user interface's working area with discrete coordinate values or can be positioned within the working area relative to other objects. Also, the geometrical objects can be defined with absolute and discrete properties or with properties that are relative to other objects. As such, each object can be independent of other objects (absolute values) or dependent on other objects (relative values).

The geometrical objects can be nested within each other, overlaid on top of one another or located randomly without rigid structure within the working area as an object. Further, with regard to HTML environments, since the geometrical objects are considered true objects, and not tables, they can exist without rigid structure in either HTML environments or non-HTML environments. As a result, the geometrical objects are not subject to the strict orthogonality requirements of formatted tables when converted to HTML environments.

In addition, each geometrical object can contain the information as interactive multimedia, such as text, graphics, audio media, video media, hyperlinks, etc., thereby enabling a remote user to sort, adjust, manipulate and view the information in real time. For example, the object can be a grid and the information can be located within the grid as data items, each data item being associated with detailed information. Data items of the grid can be viewed with detailed or general views by dynamically expanding and contracting the grid in response to remote user input. For HTML and WWW environments, real time expansion and contraction is accomplished by utilizing a unique server-side and client-side processing scheme for collecting and displaying the multi-viewable data and associated formatting and client-side processing for providing dynamic sorting and adjustment of the results by a remote user.

Exemplary Operating Environment

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

Presentation and Display of Information
Components and Operation

Figure 2:
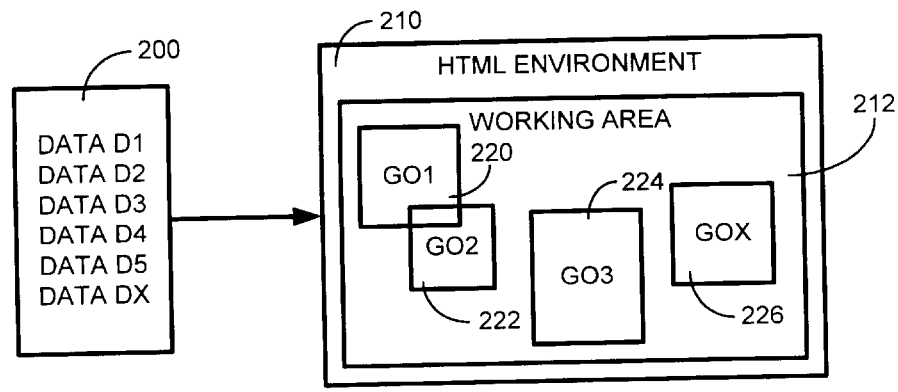
FIG. 2 is a block diagram illustrating an overview of the present invention.

FIG. 2 is a block diagram illustrating an overview of the present invention. The present invention enables data 200, such as multimedia information including text, graphics, audio media, visual media and hyperlinks, to be effectively presented and displayed within a working area of a user interface layout of a computer environment 210. The data 200 is contained within geometrical objects, which can be located anywhere within a working area 212 with discrete coordinate definitions based on absolute or relative positioning within the working area.

In other words, the geometrical objects can be absolutely positioned within the working area with discrete coordinate values or can be positioned within the working area relative to other objects. Also, the geometrical objects can be defined with absolute and discrete properties or with properties that are relative to other objects. Consequently, each object can be independent of other objects (absolute values) or dependent on other objects (relative values).

The geometrical objects can be nested within each other, overlaid on top of one another (as shown in FIG. 2), located randomly within the working area 212 or subsequently repositioned or resized based on absolute or relative values. Each geometrical object can contain any suitable combination of the data. Since the geometrical objects are considered true objects, and not fixed formatting, such as tables in HTML environments, they can exist and be modified within the working environment 210 based on either absolute or relative formatting without the rigid structure formatting that is required by fixed formatting. Thus, with regard to HTML environments, the geometrical objects are not subject to the strict orthogonality requirements of formatted tables and can dynamically change.

For instance, data values D1, D2, D3, D4, D5, Dx can be located within geometrical objects of a predefined working area 212 of HTML environment 210. The geometrical objects can have absolute or relative positions and properties. As an example, D1 and D2 can be located within a geometrical object (GO1) 220 that is precisely positioned within the HTML environment based on an initial absolute location and absolute properties, such as coordinate location=(10,10) and size property=(height: 30, width: 30).

Similarly, data values D3 and D4 can be located within a geometrical object (GO2) 222 that is precisely positioned within the HTML environment based on an initial relative location and relative properties, such as coordinate location= GO1+(15,35) and size property=(height: ⅔ of GO1, width: ⅔ of GO1). Also, Data D5 can be located within a geometrical object (GO3) 224 that is precisely positioned within the HTML environment based on an absolute position and relative properties, such as coordinate location=(50,27) and size location=(height: 1.5 of GO1, width: 1.25 of GO2). Thus, any data, Data Dx, can be located within any suitable geometrical object (GOx) 226 that is precisely positioned within the HTML environment based on either absolute or relative locations and either absolute or relative properties. Further, since the geometrical objects are true objects within the HTML environment, their positions, sizes etc. can always be dynamically modified based on absolute or relative formatting changes. This enables dependent objects to be modified together and independent objects to be modified separately.

Figure 3:
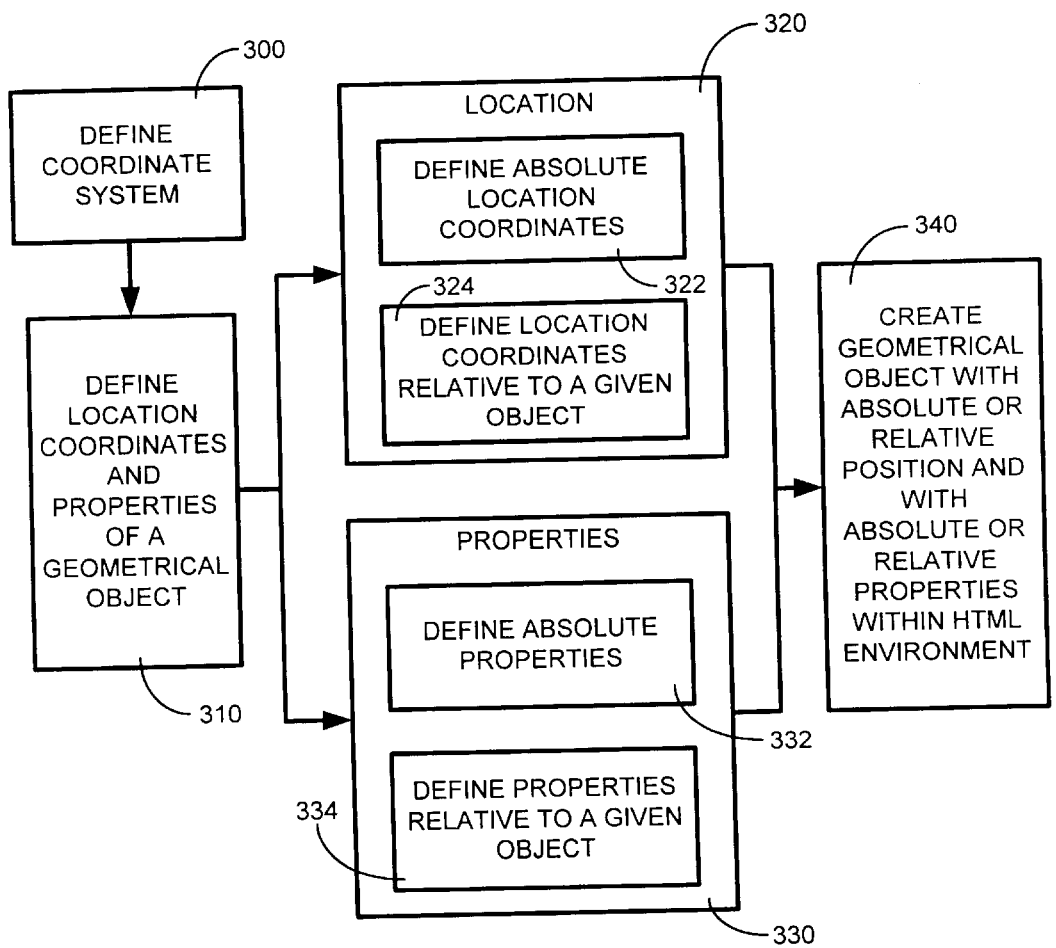
FIG. 3 is a flow diagram illustrating the general operational flow of the present invention.

FIG. 3 is a flow diagram illustrating the general operational flow of the present invention. First a single or multi-referenced coordinate system is defined (box 300). The coordinate system can be a multi-dimensional coordinate system. Second, location coordinates and properties of the geometrical objects are defined (box 310). The location coordinates (box 320) can be defined as either absolute location coordinates (box 322) or as relative location coordinates (box 324). Next, the properties (box 330) can be defined as either having absolute properties (box 332) or relative properties (box 334). Last, the geometrical objects with the previously defined absolute and relative formatting are created within a working area, such as a HTML environment 210 for display, manipulation and absolute and/or relative modification (box 340), as shown in FIG. 2.

For example, referring to FIG. 2, if the coordinate system is a two dimensional coordinate system, object 220 can be defined as having an absolute coordinate location of (10 x units, 10 y units) and an absolute size property of height (30 x units) and width (30 y units). Similarly, object 222 can be defined as having a relative coordinate location of object 220 plus (15 x units, 35 y units) and a relative size property of height ⅔ of object 220 and width ⅔ of object 220. Also, object 224 can be defined as having an absolute coordinate location of (50 x units, 27 y units) and a relative size property of height (1.5 of object 220) and width (1.25 of object 222). As an example, typical HTML programming code to define object 220 can be written as: r1;x10;y10;w30;h30;tS;d"Rect 1", where r1 is a first rectangular object, x10 and y 10 are absolute coordinate positions, w30 and h30 are absolute height and width sizes, tS is the type of data and d"Rect 1" is the name of the first rectangular object 220.

WORKING EXAMPLE

Figure 4:
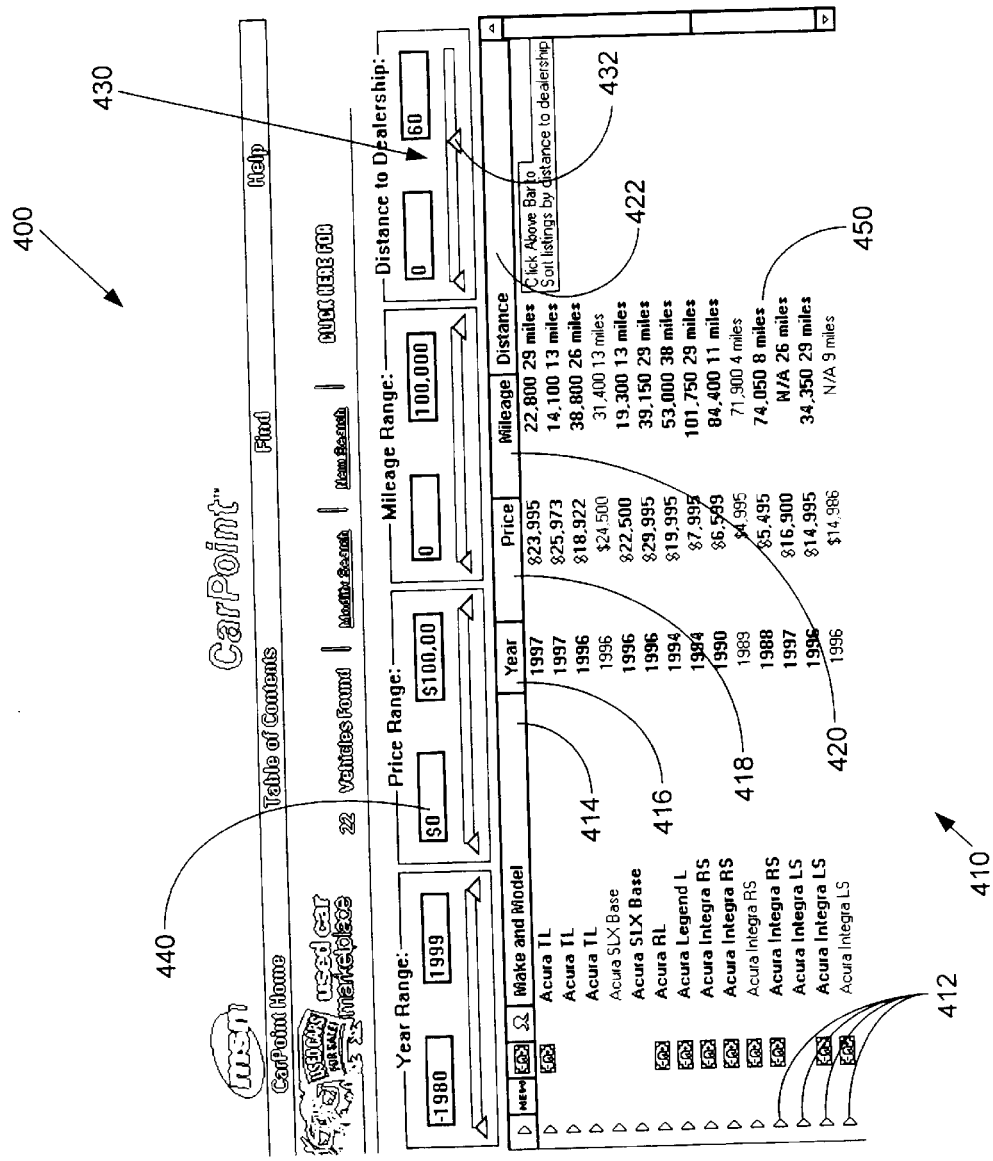
FIGS. 4 and 5 are sample user interfaces of a working example of FIG. 2 of the system and method of the present invention.
Figure 5:
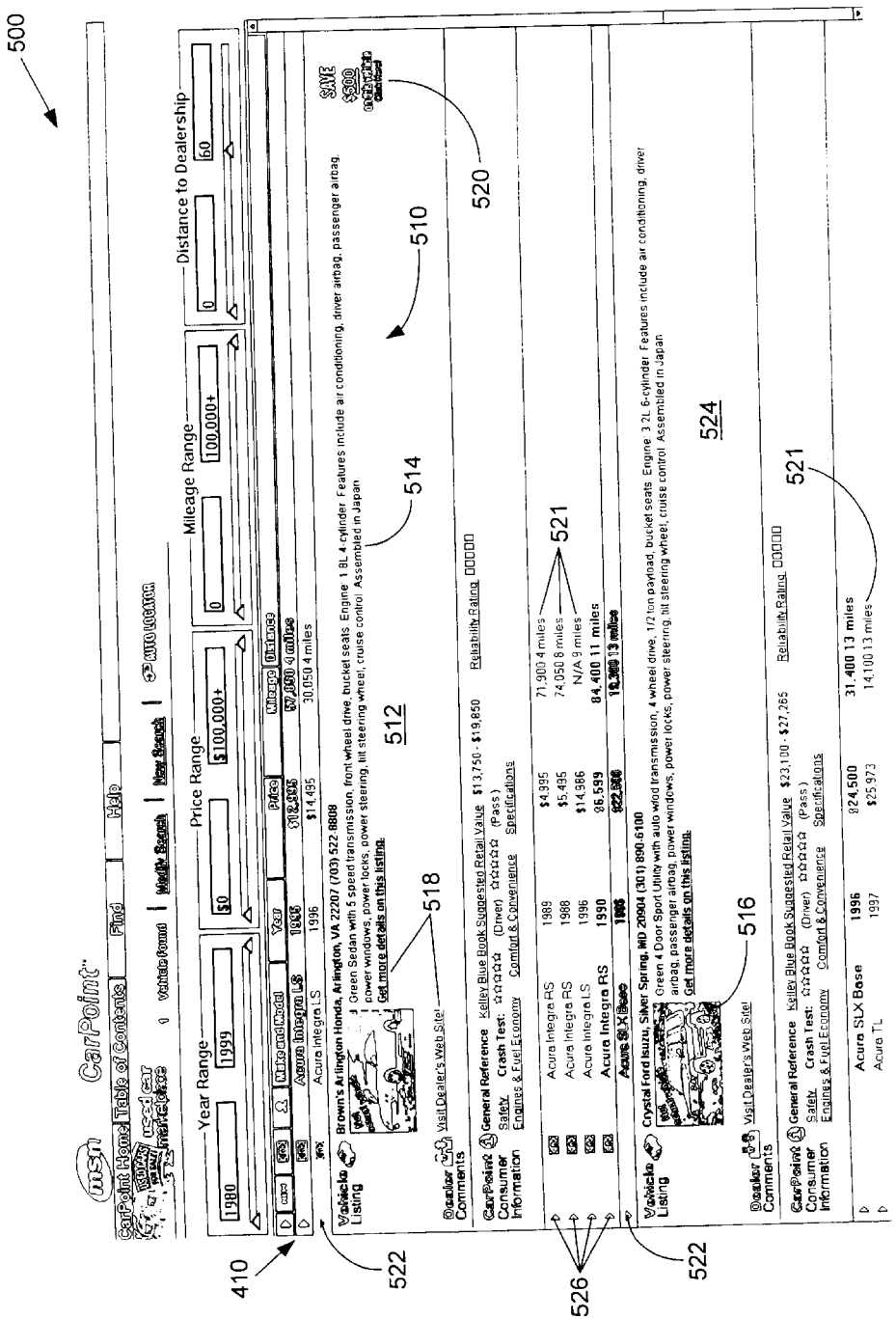

FIGS. 4 and 5 are sample user interfaces of a working example of FIG. 2 of the system and method of the present invention specifically for HTML environments. FIGS. 4 and 5 are for illustrative purpose only and show a working example utilizing a control, such as a script or a batch file utilizing JavaScript. The script or batch file can be written in any suitable scripting language, such as C++, Java, Visual Basic. The control component allows user manipulation of the results with graphical user interface development tools.

Remote users can request desired information from a server, for example, information about automobile or home sales, with a query with user defined criteria. The user defined criteria narrows the data results. For instance, for used car sale information, the user defined criteria can be the manufacturer make and model of the specific automobile, zip code area, desired mileage, etc., and for real estate sales, the user defined criteria can be location, property type, etc. The user defined criteria can be obtained from the user in any suitable manner. Next, the system ensures that the client has a processing plug-in control module, such as an ActiveX portability container, coupled to the client. If the client does not have the plug-in module, the plug-in control module is transmitted from the server and installed on the client.

Data relating to the request is then collected and generated on a server for populating a geometrical object, such as a grid with initial high level results categorically organized in response to a remote user's request for information. As an example, the data can be used car information organized by price, year, miles, etc. or real estate information organized by location, price, type of home, etc. The grid is preferably a geometrical formatted area or a template having at least one field and associated criteria and can contain static or dynamic information, such as text, graphics, audio, video, hyperlinks, etc.

The initial high level results are transmitted to the client. It should be noted that in one embodiment the server can generate both high level and low level results at the same time or separately. Also, the server can initially transmit only the high level results in response to the initial query and the low level detailed results can be subsequently transmitted only in response to a low level request for details by the remote user. Alternatively, both the high and low level results can be transmitted at the same time in response to the initial query. In this case, although the low level results are transmitted to the client, they are not displayed until the client initiates a subsequent request for the low level results. Also, the server does not need to be re-accessed for subsequent queries for low level results.

The data associated with the results can be encoded and compressed "on the fly" or be available as stored accessible raw results with corresponding pre-compressed data or pre-encoded data representing the results. The results are transmitted to the client preferably as encoded pre-compressed data and in a format that is transparent to the client user. The encoded data representing the results are decoded by the plug-in control module at the client to reproduce the raw results, which are displayed on the user interface 400 of the client in a user readable format 410 as shown in FIG. 4.

The initial results are displayed on the client's user interface within a grid in an organized and pre-formatted manner. Referring to FIG. 4, a grid 410 can have item results 412, such as single or multiple line items, categorically organized, for example by car make and model 414, car price 416, car year 418, car mileage 420, dealership distance from the user 422, etc., as shown in FIG. 4. Each line item 412 of the grid 410 is dynamically expandable and contractible for providing real time interaction of the results.

If the user desires the initial general results, the client can display the initial results to the client within the grid as line items 412, with, for example, a contracted format view. If the user desires detailed results of a particular line item 412, depending on scheme, the detailed results 510 can be displayed within the grid 410 in an expanded format 512, as shown in FIG. 5. For instance, if the low level results were not initially sent with the server's response to the client's initial query, the client transmits a low level request to the server. The server generates a data compilation for populating the grid with details of the particular line item. The server then transmits the detailed results to the client user and the control module displays the detailed results 510 within the grid 410 as an expanded view 512, as shown in FIG. 5. Alternatively, if the low level results were initially sent with the server's response to the client's initial query, the low level results detailed results 510 are simply displayed within the grid 410 as an expanded view 512, as shown in FIG. 5.

Also, an alternative client-server processing scheme can be employed. Namely, the initial high level results and only low level formatting and template information, and not the actual low level data, are transmitted in response to an initial request by the remote user. Consequently, when the user desires the detailed results of the particular line item 412, the server receives the request and compiles only the raw data, without formatting, for populating the pre-formatted and pre-transmitted grid with the details of the particular line item. The server then transmits the details, as raw data without formatting, to the client user and the control module displays the detailed results 510 within the grid 410 as an expanded view 512, as shown in FIG. 5.

In all cases, the expanded view of the grid can contain static or dynamic information, such as plain text 514, graphics 516, dynamic audio (not shown), dynamic video (not shown), hyperlinks 518, direct marketing advertisements 520, etc. Also, if a cache memory (temporary storage of data) is available on the client, previously expanded line items can be re-expanded without re-accessing the server for real time interaction and display. This can be accomplished by storing expanded details of the particular line item in the client's cache memory and simply re-accessing the client's own cache memory, instead of the server, when a request is made for the previously expanded line item.

Further, the grid is dynamically configured which allows real time viewing and interaction of multiple expanded line items 522 with details 524 within the grid 410 and multiple contracted line items 526 at the same time. This provides convenient comparison and real time interactivity for sorting, adjusting and filtering the detailed and general item information with one grid view with the interface options, as discussed below. The client user is provided with real time interactivity of the results through interactive user interface options, such as graphical user interface tools, including selectable areas.

For example, as shown in FIG. 4, a selectable area, such as the distance category 422, can be selected by the user in order to dynamically sort the results based on distance criteria 450 of each item. Since the plug-in control module resides on the client, interactivity by the client is in real time. Therefore, as the user adjusts each of the sorted fields (car or home price, car mileage, car year, type of home, age of home, etc.), the data is sorted and displayed by the client dynamically.

Conversion and Generation of Objects within HTML Environments

General Operation

Figure 6:
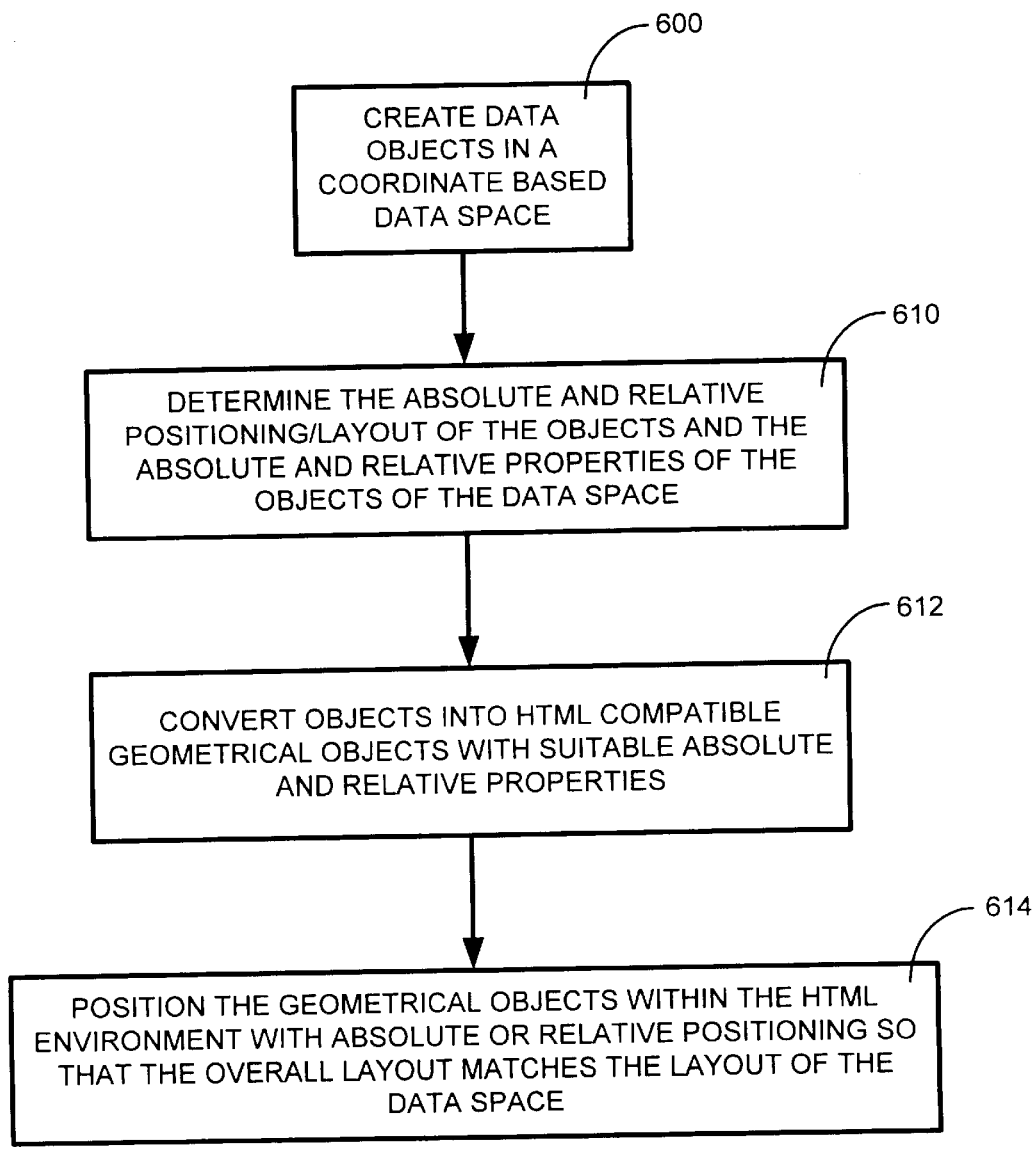
FIG. 6 is a detailed flow diagram illustrating the operational flow for automatically generating absolute and relative geometrical objects in HTML environments in accordance with the present invention.

FIG. 6 is a detailed flow diagram illustrating the operational flow for automatically generating absolute and relative geometrical objects in HTML environments in accordance with the present invention. First data objects of a coordinate based data space is created (box 600). For example, text, graphics, audio media, video media, hyperlinks, etc. can be laid-out in a non-HTML constrained object-oriented digital work space, such as a coordinate referenced canvas or digital work space of a graphic design software program.

Second, the system evaluates the entire data space and determines absolute and relative positioning/layout of the objects and absolute and relative properties of the objects of the data space (box 610). The entire data space can be evaluated by assigning an absolute position and absolute properties (size, color, etc.) of each data object of the data space. Also, each data object can be assigned positions and properties that are relative to other data objects within the data space.

Next, the objects are optimally converted into HTML compatible geometrical objects with suitable absolute and relative properties (box 612). The user can manually assign each geometrical object with absolute properties (independent object) or relative properties (dependent object). Alternatively, any suitable optimization technique can be used to automatically determine the optimal property assignments of the geometrical objects to accommodate the data contained within the geometrical objects and to allow an HTML layout that matches the data space layout.

Last, the compatible geometrical objects are positioned within the HTML environment with absolute or relative positioning so that the overall HTML layout matches the data space layout (box 614). In addition, the user can manually assign each geometrical object with absolute locations (independent object) or relative locations (dependent object). Alternatively, any suitable arrangement technique can be used to automatically arrange the geometrical objects within the HTML environment with absolute or relative positions so that the overall layout of the HTML environment matches the layout of the data space.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A formatting system for computer environments comprising a plurality of geometrical objects located within a mufti-referenced coordinate system, the mufti-referenced coordinate system comprising relative coordinates used to define each dependent geometrical object relative to an independent geometrical object for providing relative positioning and sizing with no orthogonality requirements, real time modification of the objects within the coordinate system such that modification of the independent geometrical object modifies each dependent geometrical object, wherein the geometrical objects are randomly configurable in a user interface layout as layered objects being overlaid on top of one another such that the dependent geometrical objects are outside of the independent geometrical object.

2. The formatting system of claim 1 wherein the geometrical objects are configurable within other geometrical objects.

3. The formatting system of claim 2 wherein the geometrical objects are configurable as nested objects located within another with absolute and relative coordinate positioning.

4. The formatting system of claim 1 wherein the computer environment is a computer user interface layout.

5. The formatting system of claim 4 wherein the user interface layout is a working area of a HTML environment.

6. The formatting system of claim 4 wherein the user interface layout is a visual programming application layout.

7. The formatting system of claim 4 wherein the user interface layout is a working canvas area of a computer publishing application.

8. The formatting system of claim 1 wherein the geometrical objects contain interactive content.

9. The formatting system of claim 8, wherein the interactive content is at least one of textual information, graphical information, and audio and visual multimedia information.

10. A display device for a user interface layout of a computer environment having rendered thereon dynamically changing content, comprising a plurality of multi-referenced coordinate grids each having plural fields and associated criteria, wherein each dependent grid is defined by coordinates relative to an independent grid for providing relative positioning and sizing without orthogonality requirements, real time modification of the grids within the coordinate system, wherein modification of the independent grid also modifies each dependent grid, wherein the grids are randomly configurable at any position within the user interface layout including being overlaid on top of one another such that a dependent grid is outside of its independent grid.

11. The display device of claim 10 wherein the grids are configurable within other grids.

12. The display device of claim 11 wherein the grids are configurable as nested grids located within another with absolute and relative coordinate positioning.

13. The display device of claim 10 wherein the user interface layout is a working area of a HTML environment.

14. The display device of claim 10 wherein the user interface layout is a visual programming application layout.

15. The display device of claim 10 wherein the user interface layout is a working canvas area of a computer publishing application.

16. The display device of claim 10 wherein the grids contain interactive content.

17. The formatting system of claim 16 wherein the interactive content is at least one of textual information, graphical information, and audio and visual multimedia information.

18. A method for displaying content within a computer environment comprising:
- providing a multi-referenced coordinate system having a plurality of geometrical objects located therein;
- defining each dependent geometrical object within the coordinate system by coordinates relative to an independent geometrical object;
- providing absolute and relative positioning and sizing without orthogonality requirements, and real time modification of the objects within the coordinate system such that modification of the independent geometrical object modifies each dependent geometrical object; and
- locating at least one of the dependent geometrical objects outside its corresponding independent geometrical object.

19. The method of claim 18 wherein the geometrical objects are configurable within other geometrical objects.

20. The method of claim 19 wherein the geometrical objects are configurable as layered objects being overlaid on top of one another.

21. The method of claim 19 wherein the geometrical objects are configurable as nested objects located within another with absolute and relative coordinate positioning.

22. The method of claim 18 wherein the computer environment is a computer user interface layout.

23. The method of claim 22 wherein the user interface layout is a working area of a HTML environment.

24. The method of claim 22 wherein the user interface layout is a visual programming application layout.

25. The method of claim 22 wherein the user interface layout is a working canvas area of a computer publishing application.

26. The method of claim 18 wherein the geometrical objects contain interactive content.

27. The method of claim 26, wherein the interactive content is at least one of textual information, graphical information, and audio and visual multimedia information.

28. A method for converting non-preformatted objects organized within a coordinated defined data space and presenting and displaying the converted objects within a fixed format based environment comprising:
- evaluating the data space and determining absolute and relative positioning and absolute and relative properties of the objects of the data space; converting the objects and associated data contained in the objects into compatible geometrical objects of the fixed format based environment and assigning suitable absolute and relative properties, the compatible geometrical objects including an independent geometrical object and dependent geometrical objects; and
- positioning the compatible geometrical objects within the fixed format based environment with at least one of absolute and relative positioning to create an overall layout within the fixed format based environment that matches the organization of the non-preformatted objects within the data space, wherein the dependent geometrical objects include the relative properties that are relative to the independent geometrical objects such that modification of the independent geometrical object also modifies each of the dependent geometrical objects, and wherein the dependent geometrical objects are located randomly in a user interface layout including outside of the independent geometrical object.

29. The method of claim 28 wherein the fixed format based environment is a hypertext markup language environment.

* * * * *